(12) United States Patent
Takahashi et al.

(10) Patent No.: US 9,049,492 B2
(45) Date of Patent: Jun. 2, 2015

(54) PORTABLE TERMINAL, VIDEO DATA REPAIR METHOD AND PROGRAM

(75) Inventors: Masaki Takahashi, Tokyo (JP); Toshio Oka, Kanagawa (JP); Ryo Yokoyama, Kanagawa (JP); Satoshi Senga, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 446 days.

(21) Appl. No.: 13/145,423

(22) PCT Filed: Dec. 28, 2009

(86) PCT No.: PCT/JP2009/007342
§ 371 (c)(1),
(2), (4) Date: Jul. 20, 2011

(87) PCT Pub. No.: WO2010/084562
PCT Pub. Date: Jul. 29, 2010

(65) Prior Publication Data
US 2011/0273618 A1     Nov. 10, 2011

(30) Foreign Application Priority Data
Jan. 21, 2009   (JP) ................................. 2009-011039

(51) Int. Cl.
| *H04N 5/94* | (2006.01) |
| *H04N 9/88* | (2006.01) |
| *H04N 21/61* | (2011.01) |
| *H04H 20/57* | (2008.01) |
| *H04H 60/11* | (2008.01) |
| *H04H 60/27* | (2008.01) |
| *H04N 21/414* | (2011.01) |
| *H04N 21/4425* | (2011.01) |
| *H04N 21/443* | (2011.01) |

(52) U.S. Cl.
CPC .......... *H04N 21/6131* (2013.01); *H04H 20/57* (2013.01); *H04H 60/11* (2013.01); *H04H 60/27* (2013.01); *H04N 21/41407* (2013.01); *H04N 21/4425* (2013.01); *H04N 21/4436* (2013.01)

(58) Field of Classification Search
None
See application file for complete search history.

(56) References Cited

U.S. PATENT DOCUMENTS

| 8,510,615 | B2 * | 8/2013 | Tredoux ........................ 714/723 |
| 2002/0083366 | A1 * | 6/2002 | Ohran ............................. 714/13 |
| 2005/0244140 | A1 * | 11/2005 | Blacquiere .................... 386/116 |
| 2006/0059025 | A1 | 3/2006 | Kato et al. |
| 2007/0110236 | A1 | 5/2007 | Tada |
| 2008/0136685 | A1 | 6/2008 | Takahashi |
| 2010/0067335 | A1 * | 3/2010 | Li et al. ...................... 369/47.14 |

FOREIGN PATENT DOCUMENTS

| JP | 2006-352264 | 12/2006 |
| JP | 2008-085986 | 4/2008 |
| WO | 2005/043806 | 5/2005 |

* cited by examiner

*Primary Examiner* — Heather Jones
(74) *Attorney, Agent, or Firm* — Greenblum & Bernstein, P.L.C.

(57) ABSTRACT

A portable terminal wherein the amount of processing and power consumption when performing repair is reduced and video data can be reliably repaired, and video data repair method and program of the same. The portable terminal is provided with a video data repairer that repairs video data in which video is poor by replacing it with a portion of video data acquired from an external source, said video data repairer saving, without deleting at the time of repairing, all of partial video data necessary to decode subsequent video data continuing after the video data to be repaired, and performing control so that only the portion of the video data that is repaired is re-encoded.

8 Claims, 17 Drawing Sheets

EXTRACTION OF VIDEO
DATA TO BE REPAIRED

REPAIR OF VIDEO DATA

RE-ENCRYPTING

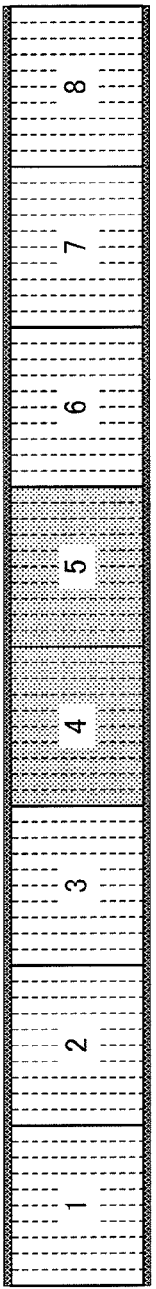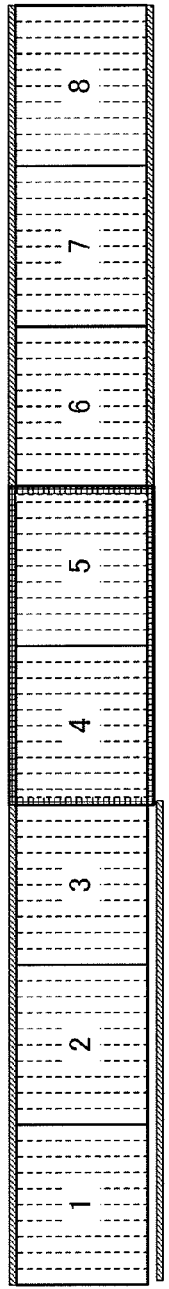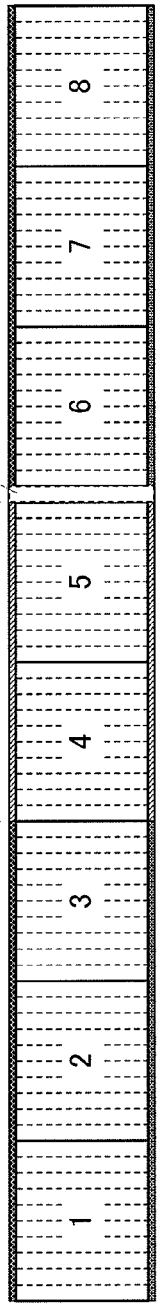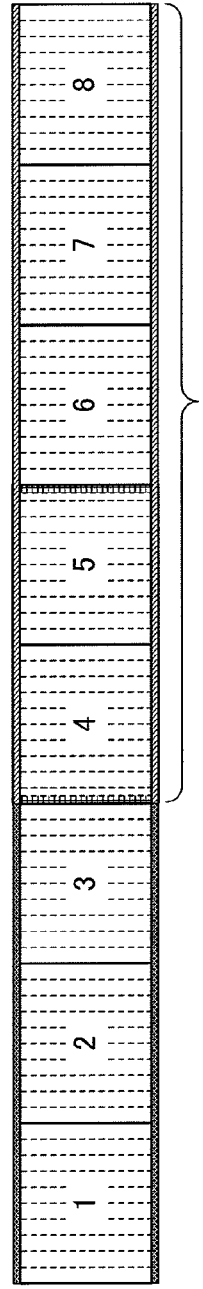

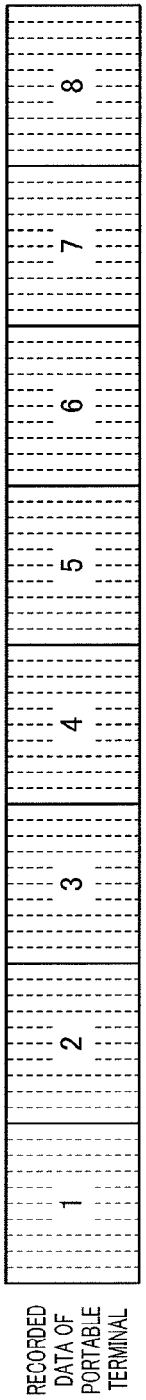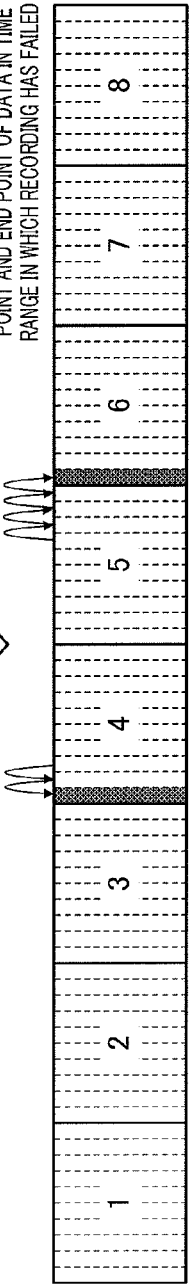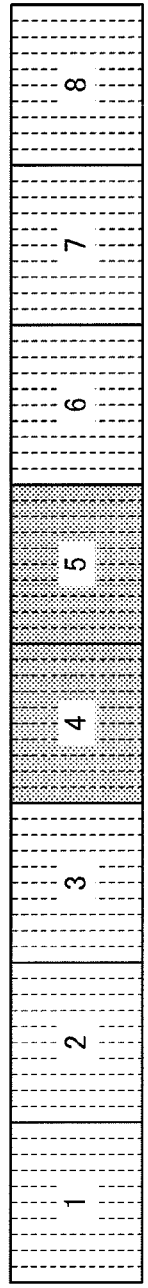

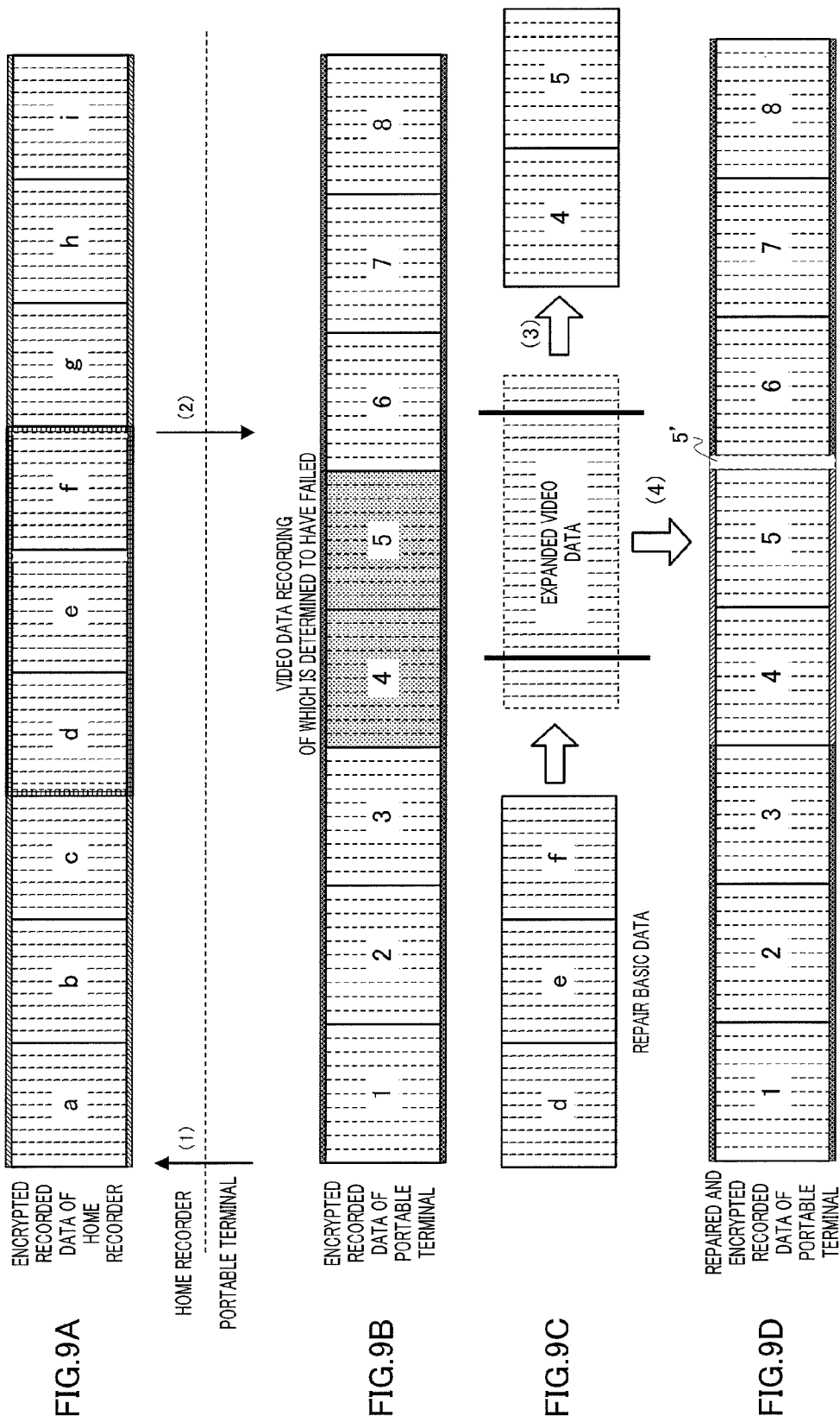

EXTRACTION OF VIDEO
DATA TO BE REPAIRED

REPAIR OF VIDEO DATA

RE-ENCRYPTING ately preceding.

PORTABLE TERMINAL, VIDEO DATA REPAIR METHOD AND PROGRAM

TECHNICAL FIELD

The present invention relates to a portable terminal that receives video data, a video data repair method and a program. More particularly, the present invention relates to a portable terminal that repairs video data in a case where a portion of the video data saved by recording or the like is distorted, a video data repair method, and a program.

BACKGROUND ART

A portable terminal with a TV tuner is becoming widely used. There is a need for scheduled recording of a desired program in the portable terminal with a TV tuner. However, there is a case where midstream video remains distorted during recording due to poor radio wave conditions and the like. A service in which scheduled recording in a recorder at home is requested via a network at the same time of scheduled recording in the portable terminal, a video portion in which recording has failed is made to be transmitted from the recorder side afterward, and repaired video data can be watched is assumed.

Patent Literature 1 describes a portable terminal that acquires entire recorded data containing a portion that has not been recorded successfully after the end of broadcasting.

FIG. 1 illustrates a configuration of a repair processing system of copyrighted video data described in Patent Literature 1.

As shown in FIG. 1, video data repair system 10 is configured to have portable terminal 11 that can receive digital terrestrial television broadcasts, recording server 12a installed in telecommunications carrier (carrier) 12 that provides portable phone services and Broadcast station server 13a installed in broadcast station 13 that transmits television programs by digital broadcasting. Broadcast station server 13a of broadcast station 13 transmits program data to recording server 12a via communication line 14, and recording server 12a receives and saves the transmitted program data.

A video data repair method in the above system is as follows.

When a desired program is to be recorded in portable terminal 11 as shown in FIG. 1, there is a case where a portion of the program cannot be recorded due to poor reception conditions. In this case, portable terminal 11 specifies the portion of the program that has not been recorded successfully and requests recording server 12a for transmission of the specified program portion. Broadcast station server 13a of the broadcast station transmits the program data to recording server 12a via communication line 14 by the end time of the program at the latest, and recording server 12a receives and saves the transmitted program data. Portable terminal 11 then receives the program data transmitted from recording server 12a and repairs recorded data saved in portable terminal 11 by the transmitted program data.

FIGS. 2A to 2C schematically illustrate video data repair processing of the portable terminal described in Patent Literature 1.

FIG. 2A shows recorded data of a program saved in a memory of portable terminal 11. The figure shows that recorded data is recorded in the hatched areas, and that no recorded data is recorded in blank areas 1 to 2. In this case, two blank areas 1 to 2 exist, which means recording is interrupted twice during recording of the program.

In the state shown in FIG. 2B, the program data is stored in a hard disk of recording server 12a in perfect condition. Accordingly, portable terminal 11 specifies portions of the program data that have not been recorded successfully by recording interruption information and requests recording server 12a for transmission of the specified portions of the program data. Recording server 12a extracts the requested program data from program data stored in the hard disk and transmits the extracted program data to portable terminal 11. On receiving the transmitted program data, portable terminal 11 fills the blank areas 1 to 2 of the recorded data with the received program data to repair recorded data.

FIG. 2C shows that the program data transmitted from the recording server have been filled in blank areas 1 to 2 of the recorded data respectively, and that the recorded data has been repaired in perfect condition. Hence, a user can reproduce the repaired recorded data and watch the program.

CITATION LIST

Patent Literature

PTL 1
Japanese Patent Application Laid-Open No. 2006-352264

SUMMARY OF INVENTION

Technical Problem

However, since such a conventional video data repair method has no viewpoint on copyrighted digital data, the conventional method has a problem of excessive power consumption for encoding for copyright protection and unsuitability for adoption in portable terminals. Hereinafter, the method will be described in details.

FIGS. 3A to 3C schematically illustrate conventional repair processing of copyrighted video data.

FIG. 3A shows copyrighted video data saved in the portable terminal. This video data is encrypted in a CBC (Cipher Block Chaining) mode. The CBC mode is one referred to as a cipher block chaining mode designed to deal with fraudulent acts such as code breaking and falsification, in which a result of encoding a previous clear text block is superimposed upon the following clear text by an XOR operation, a result of which being encrypted. In a case where the first block is to be encrypted, the last block of the previous cipher text or data externally provided (initial vector) is used. Encoding in the CBC mode is performed consistently from the beginning to the end of the video data. Also, to decode a cipher text block, the previous cipher text block is needed.

From this copyrighted video data there is extracted repair target video 21 that is data in which video is determined to be distorted or a blank portion.

FIG. 3B shows processing of repairing the video data by replacing repair target video 21 with video data 22 acquired from outside. In the portable terminal described in Patent Literature 1, not only repair target video 21 but also the subsequent video data need to be decoded once at the time of the repair.

FIG. 3C shows repaired video data that has been re-encrypted. Since not only the video data to be repaired but also the subsequent video data are re-encrypted, as much power as this re-encrypting is consumed.

It is therefore an object of the present invention to provide a portable terminal wherein the amount of processing and power consumption when performing repair are reduced, and video data can be reliably repaired, a video data repair method, and a program.

Solution to Problem

A portable terminal of the present invention is a portable terminal that saves video data encrypted by a method of superimposing a result of encoding a previous video data clear text block upon a following clear text block by a bit operation, a result of which being encrypted, and is configured to include a video data repair section that repairs video data which comprises poor video and is subject to repair, by replacing the video data with a portion of video data acquired from outside, wherein the video data repair section comprises a repair-target video data extraction section that extracts the video data to be repaired from the video data, a repair section that saves, instead of deleting, partial video data at the end of the video data to be repaired at the time of repairing the video data by replacing the extracted video data to be repaired with video data for repair, and a re-encrypting section that re-encrypts only the video data for repair.

A video data repair method of the present invention is a video data repair method of repairing video data which comprises poor video and is subject to repair, by replacing the video data with a portion of video data acquired from outside, and sequentially executes extracting the video data to be repaired from video data, repairing the video data which comprises poor video and is subject to repair, by replacing the video data with the portion of the video data acquired from outside, saving, instead of deleting, partial video data at the end of the video data to be repaired at the time of repairing the video data by replacing the extracted video data to be repaired with video data for repair, and re-encrypting only the video data for repair.

Also, from another viewpoint, the present invention is a program to make a computer execute a video data repair method of repairing video data which comprises poor video and is subject to repair, by replacing the video data with a portion of video data acquired from outside, the method comprising extracting the video data to be repaired from video data, repairing the video data which comprises poor video and is subject to repair, by replacing the video data with the portion of the video data acquired from outside, saving, instead of deleting, partial video data at the end of the video data to be repaired at the time of repairing the video data by replacing the extracted video data to be repaired with video data for repair, and re-encrypting only the video data for repair.

Advantageous Effects of Invention

According to the present invention, by saving, instead of deleting at the time of repairing, a block that is necessary to decode video data continuing after video data to be repaired and re-encrypting only a portion of the video data that is repaired, only the portion that is repaired can be encrypted, and repair of copyrighted video data can be processed with low power consumption.

BRIEF DESCRIPTION OF DRAWINGS

FIG. 7 illustrates a video data repair method at the time of recording failure of the portable terminal according to the present invention;
FIG. 8 illustrates a scanning method of failed video data of the portable terminal according to the present invention;
FIG. 9 illustrates communications between the portable terminal of the present invention and a home recorder and a repair data generating method.

DESCRIPTION OF EMBODIMENTS

Hereinafter, embodiments of the present invention will be described in details with reference to the drawings.

Embodiment 1

Figure 4:
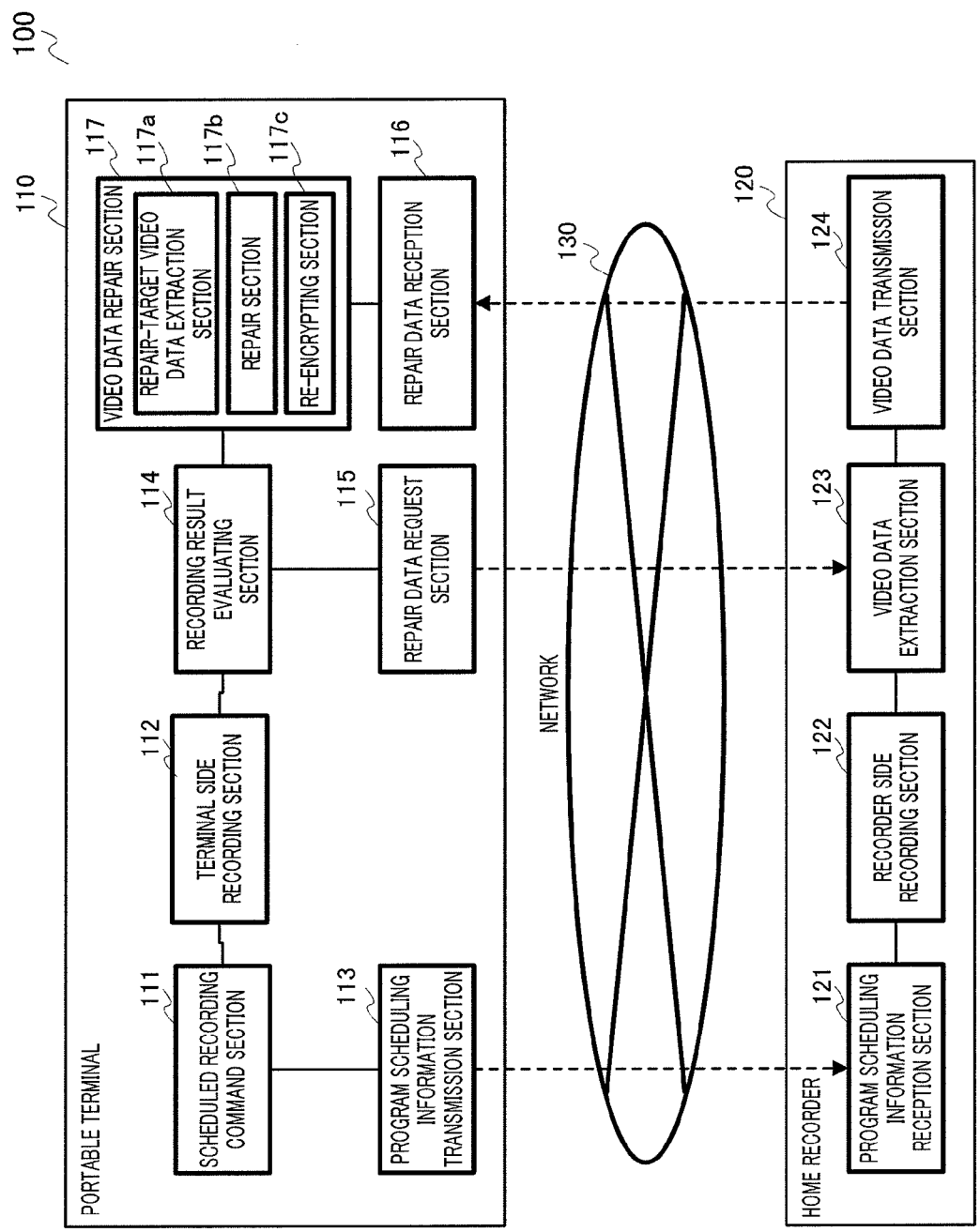
FIG. 4 is a block diagram showing a configuration of a video data repair system according to Embodiment 1 of the present invention.

FIG. 4 is a block diagram showing a configuration of a video data repair system according to Embodiment 1 of the present invention. The present embodiment is an application example to a video data repair system of a recorded program by utilizing a mobile terminal and a home recorder.

As shown in FIG. 4, video data repair system 100 is constituted by portable terminal 110, home recorder 120, and network 130 linking portable terminal 110 to home recorder 120.

Examples of portable terminal 110 are a portable phone/PHS (Personal Handy-Phone System), a portable terminal such as a personal digital assistant (hereinafter referred to as a PDA (Personal Digital Assistant), a notebook computer, and a portable game device. In a case where portable terminal 110 is applied to the portable phone, inherent function sections in the portable phone, such as an antenna and a wireless communication section for carrier communications with a base station, are not shown in the drawings.

Portable terminal 110 is configured to have scheduled recording command section 111, terminal side recording section 112, program scheduling information transmission section 113, recording result evaluating section 114, repair data request section 115, repair data reception section 116, and video data repair section 117.

Scheduled recording command section 111 manages a program channel and recording time set by a user and commands program recording.

Terminal side recording section 112 records a specified program and stores video data.

Program scheduling information transmission section 113 transmits program scheduling information constituted by the program channel and the recording time set by the user to home recorder 120 via network 130.

Recording result evaluating section 114 regards a portion of the video data in which the recorded video data is determined to be distorted, or in which a blank is determined to be made in the video as video data to be repaired by detecting a reception failure of broadcast waves or a user's operation, and manages recording failure information containing information, time, and a program channel for the video data to be repaired.

Repair data request section 115 transmits portion video data request information generated from the recording failure information to home recorder 120.

Repair data reception section 116 receives video data to be used for repair processing from home recorder 120.

Video data repair section 117 repairs the video data which comprises poor video and is subject to repair, by replacing it with a portion of video data acquired from outside. Video data repair section 117 saves, instead of deleting at the time of repairing, a block that is necessary to decode video data continuing after the video data to be repaired and performs control so that only a portion of the video data that is repaired may be re-encrypted.

More specifically, video data repair section 117 includes repair-target video data extraction section 117a, repair section 117b, and re-encrypting section 117c.

Repair-target video data extraction section 117a extracts the video data to be repaired from the video data based on the recording failure information received from recording result evaluating section 114.

Repair section 117b repairs the video data by replacing the extracted video data to be repaired with video data for repair that repair data reception section 116 has received. At this time, repair section 117b saves, instead of deleting, partial video data at the end of the video data to be repaired. The partial video data at the end is minimum data that is necessary to decode video data continuing after the video data to be repaired, and the data length varies with the encoding mode.

For example, the data at the end is 16 bytes in a case where the encryption method requires 16 bytes while the data at the end is 128 bytes in a case where the encryption method requires 128 bytes. In this manner, repair section 117b is characterized by saving, instead of deleting at the time of repairing, the data at the end. In other words, repair section 117b reserves video data that is normally unnecessary in order to decode the video data continuing after the video data to be repaired.

Re-encrypting section 117c re-encrypts only the video data for repair, which is a portion of the video data that is repaired.

Home recorder 120 is configured to have program scheduling information reception section 121, recorder side recording section 122, video data extraction section 123, and video data transmission section 124.

Program scheduling information reception section 121 receives the program scheduling information from portable terminal 110.

Recorder side recording section 122 records a program based on the program channel and the recording time stored in the program scheduling information and stores video data.

Video data extraction section 123 extracts the video data for repair from the stored video data in accordance with the portion video data request information.

Video data transmission section 124 transmits the video data for repair to portable terminal 110.

The above video data for repair is video data based on the time range and the program channel requested from portable terminal 110 through the viewpoint of home recorder 120.

Network 130 is a network constituted by a mobile communications network, the public telephone network, a LAN, or the Internet, and the network kind such as a wired or wireless network and the protocol kind do not matter. As an access line of a carrier, a high-capacity line such as FTTH (Fiber To The Home), HFC (Hybrid Fiber Coax: optical coaxial cable), or ADSL (Asymmetric Digital Subscriber Line)/VDSL (Very high data rate Digital Subscriber Line) can be utilized.

Figure 5:
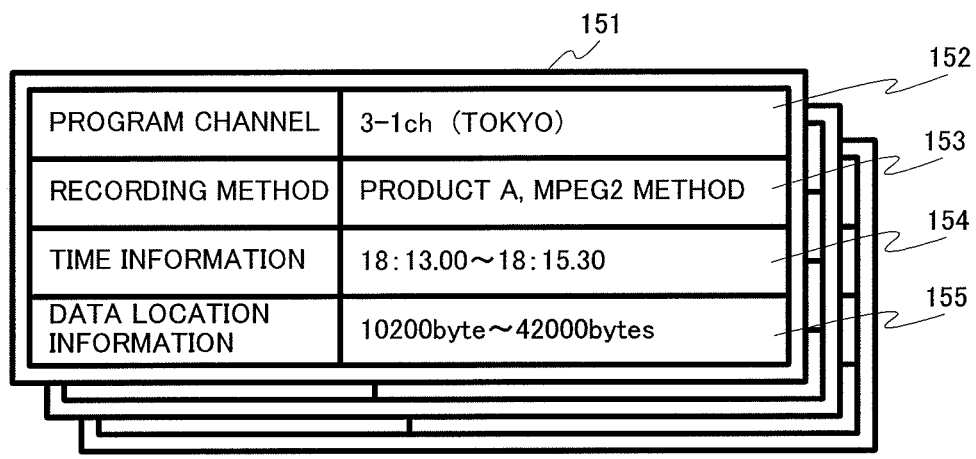
FIG. 5 illustrates a configuration of recording failure information of a portable terminal according to Embodiment 1.

FIG. 5 illustrates a configuration of recording failure information. Recording result evaluating section 114 in FIG. 4 prepares recording failure information 151.

As shown in FIG. 5, recording failure information 151 consists of parameters of program channel 152 of video data, recording method 153, time information 154, and data location information 155. The configuration of recording failure information 151 is illustrative and may be any configuration as long as it consists of necessary parameters to the video data repair processing.

Figure 6:
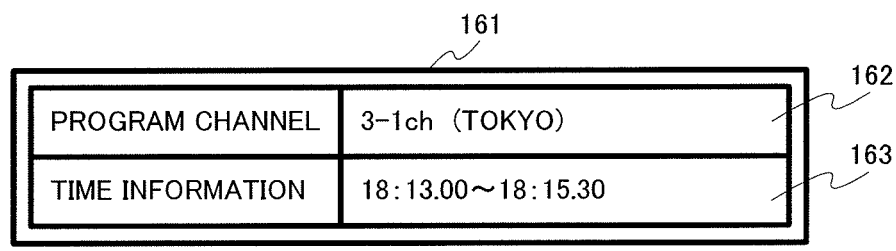
FIG. 6 illustrates a configuration of portion video data request information of the portable terminal according to Embodiment 1.

FIG. 6 illustrates a configuration of portion video data request information.

As shown in FIG. 6, portion video data request information 161 consists of parameters of program channel 162 and time information 163.

Repair data request section 115 (FIG. 4) of portable terminal 110 generates portion video data request information 161 consisting of parameters of program channel 162 and time information 163 for requested video data for repair based on recording failure information 151 in FIG. 5.

Hereinafter, an operation of the portable terminal configured as above will be described.

First, a basic idea of the present invention will be described.

[Video Repair Method at Time of Recording Failure (Basic Idea)]

FIG. 7 illustrates a video data repair method at the time of recording failure of the portable terminal according to the present invention.

FIG. 7A illustrates encrypted recorded data of the portable terminal. In FIG. 7, the encrypted recorded data are video data 1 to 8. Among video data 1 to 8, video data recording of which is determined to have failed are video data 4 and 5.

FIG. 7B illustrates encrypted recorded data of the home recorder. Since the home recorder is in stable reception and transmission conditions, video data 1 to 8 are all encrypted and recorded.

The home recorder once decrypts the corresponding portions (in this case, video data 4 and 5 in which recording has failed in the portable terminal) and transfers them to the portable terminal. The portable terminal repairs the recorded data with use of the transferred corresponding portions (video data 4 and 5).

The portable terminal repairs the video data in the following manner after the video data is decrypted.

FIG. 7C illustrates repaired and encrypted recorded data of the portable terminal. Also, FIG. 7D illustrates repaired and encrypted recorded data of a conventional portable terminal for comparison with the present invention. As shown in FIG. 7D, since previous data (generally 16 bytes) is required for video decryption, data needs to be re-encrypted after repair. In this conventional example, video data 4 to 8 are re-encrypted due to repaired video data 4 and 5. In the conventional example, as much power as this re-encrypting is consumed.

On the other hand, as shown in FIG. 7C, the present portable terminal encodes only the repaired portions. In the case of FIG. 7C, repaired video data 4 and 5 are encrypted while video data 6 to 8 are not encrypted. However, previous data (16 bytes) is required for video decryption. Accordingly, the present portable terminal reserves a part (e.g. 16 bytes, defined as data 5') of old video data 5.

The present portable terminal uses data 5' to decrypt head data of video data 6 at the time of playback. That is, the part (data 5') of old video data 5, which is normally unnecessary, is reserved. Since data 5' becomes meaningless data after decoding and is ignored by a decoder of the portable terminal, normal playback is performed. Thus, in the present portable terminal, data that is not repaired does not need to be re-encrypted.

The aforementioned video repair method at the time of recording failure enables encoding of only a repaired portion. Hereinafter, a scanning method of video data and a generating method of repair data will be described in further details.

[Scanning Method of Failed Video Data]

FIG. 8 illustrates a scanning method of failed video data of the portable terminal according to the present invention.

FIG. 8A illustrates recorded data of the portable terminal. (1) The portable terminal identifies a time range in which recording has failed from the recording failure time information. In FIG. 5, the portable terminal determines that recording has failed in the time range shown in the figure in video data 4 and video data 5.

As shown in FIG. 8B, (2) the portable terminal scans cuttable points closest to the start point and the end point of the data in the time range in which recording has failed. An example of the cuttable point is a start header.

As shown in FIG. 8C, (3) the portable terminal sets recorded data in which recording has failed and generates repair requirement time information (start time and period or end time).

With the scanning method of failed video data, video is not distorted at joint parts of the repaired portion.

[Communications Between Portable Terminal and Home Recorder and Repair Data Generating Method]

FIG. 9 illustrates communications between the portable terminal and the home recorder and a repair data generating method. FIG. 9A illustrates encrypted recorded data a to i of the home recorder. FIG. 9B illustrates encrypted recorded data 1 to 8 of the portable terminal, FIG. 9C illustrates repair data, and FIG. 9D illustrates repaired and encrypted recorded data of the portable terminal.

As shown in FIG. 9A, the home recorder is in stable reception and transmission conditions, and video data a to i are all encrypted and recorded.

As shown in FIG. 9B, among encrypted recorded data (video data) 1 to 8 of the portable terminal, video data recording of which is determined to have failed are video data 4 and 5.

The portable terminal communicates with the home recorder and generates repair data in the following manner.

As shown by an arrow in FIGS. 9A and 9B, (1) the portable terminal transmits to the home recorder repair requirement time information for video data 4 and 5 in a video unit (e.g. GOP (Group Of Pictures)).

As shown by an arrow in FIGS. 9A and 9B, (2) the home recorder returns to the portable terminal repair basic data d, e, and f, which are decrypted video units containing data corresponding to the received repair requirement time information, and repair basic data time information. The portable terminal receives repair basic data (video units) d, e, and f and the repair requirement time information transmitted from the home recorder.

As shown in FIG. 9C, (3) the portable terminal decodes received repair basic data (video units) d, e, and f, extracts video data required for repair based on the received repair requirement time information, and encodes the video data into repair data (video units 4 and 5).

As shown by an arrow in FIGS. 9C and 9D, (4) the portable terminal performs repair processing with use of the repair data (video units 4 and 5).

As shown in FIG. 9D, the portable terminal encodes only repaired video data 4 and 5. The portable terminal uses data 5' to decrypt head data of video data 6 at the time of playback. Since data 5' becomes meaningless data after decryption and is ignored by the decoder of the portable terminal, normal playback is performed.

In this manner, video repair can be performed even in a case where video formats of the home recorder and the portable terminal are different from each other.

The basic idea of the present invention has been described above. Next, an operation of portable terminal 110 in the present embodiment will be described.

Figure 10:
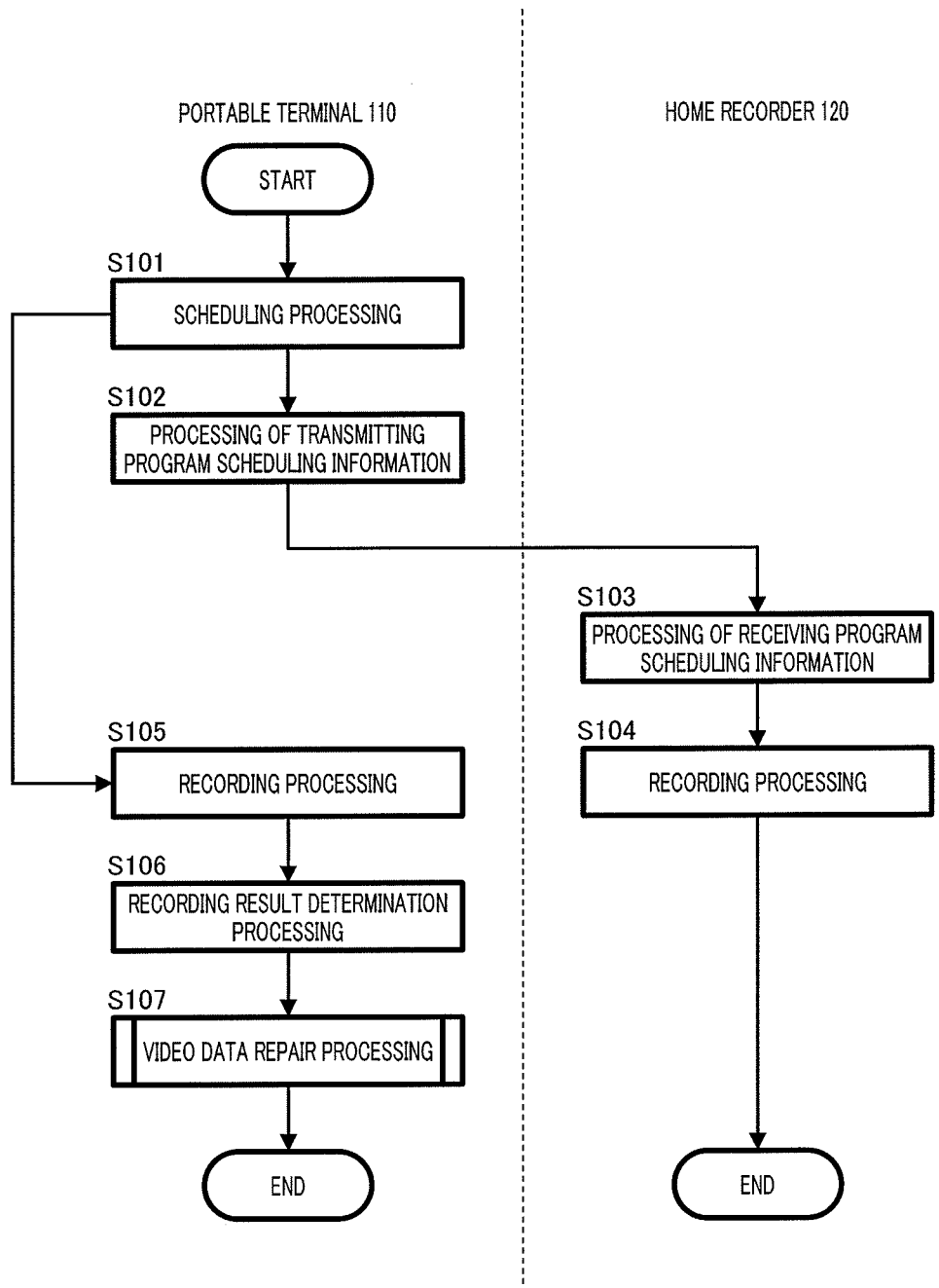
FIG. 10 is a flowchart showing video data repair processing of a recorded program in the portable terminal according to Embodiment 1 with use of the home recorder.

FIG. 10 is a flowchart showing video data repair processing of a recorded program in portable terminal 110 with use of home recorder 120. In the figure, S represents each step of the flow.

First, in step S101, scheduled recording command section 111 of portable terminal 110 commands program recording to terminal side recording section 112 based on a program channel and recording time for scheduled recording that scheduled recording command section 111 manages and sends to program scheduling information transmission section 113 the managed program channel and recording time as program scheduling information.

In step S102, program scheduling information transmission section 113 of the portable terminal 110 transmits the program scheduling information via network 130.

In step S103, program scheduling information reception section 121 of home recorder 120 receives the program scheduling information transmitted from portable terminal 110.

In step S104, recorder side recording section 122 of home recorder 120 records a program based on the program channel and the recording time stored in the program scheduling information and stores video data to end the flow.

In step S105, terminal side recording section 112 records the program that scheduled recording command section 111 has specified and stores the video data.

In step S106, recording result evaluating section 114 of portable terminal 110 determines that the video data that terminal side recording section 112 is recording is distorted, or a blank is made in the video, by detecting a reception failure of broadcast waves or a user's operation such as a pause of recording, and collects recording failure information containing the time information and the program channel.

In step S107, video data repair section 117 of portable terminal 110 performs video data repair processing based on the recording failure information to end the flow.

Details of the video data repair processing will be described in FIG. 11.

Figure 11:
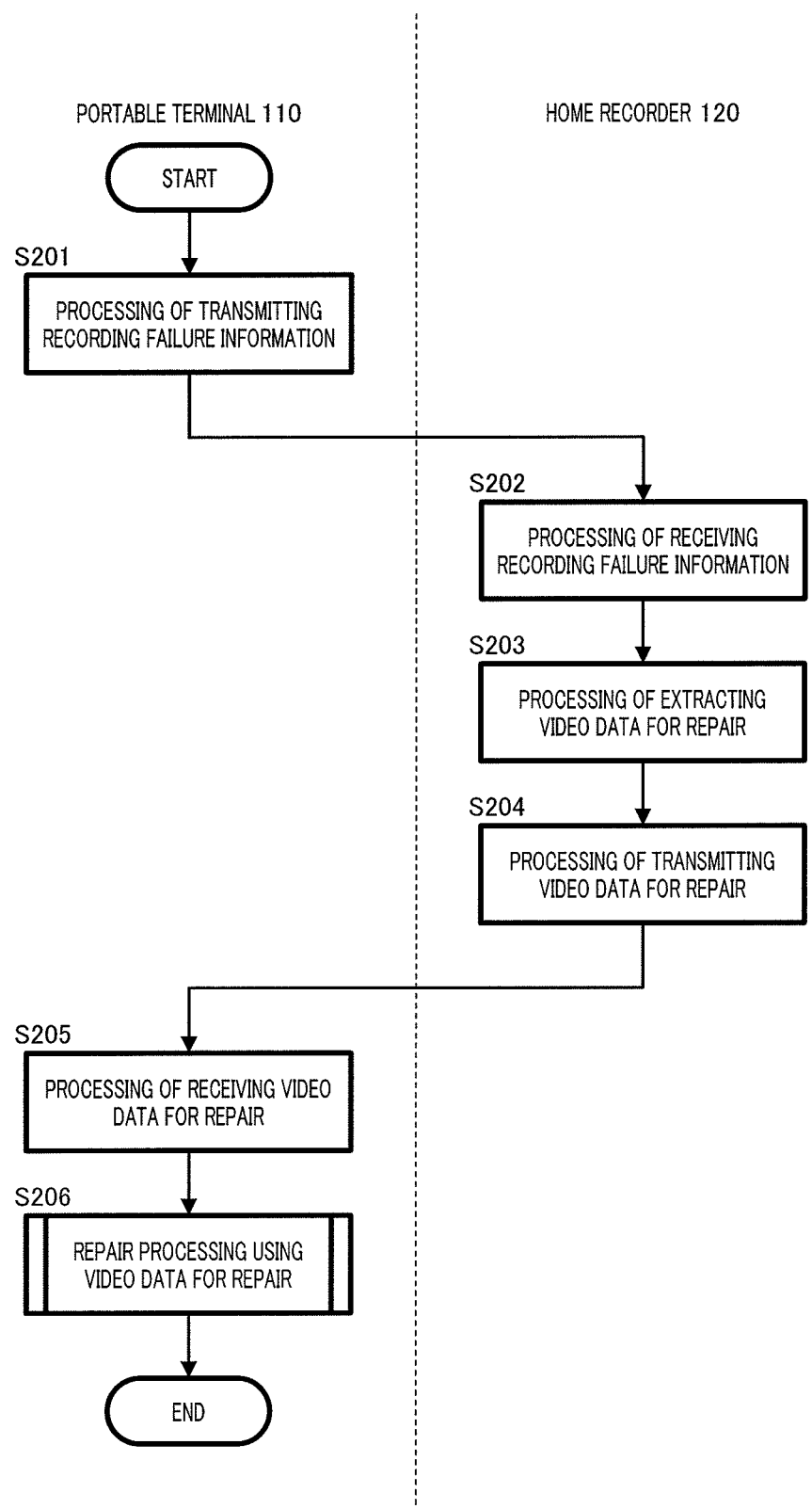
FIG. 11 is a more detailed flowchart of the video data repair processing of the portable terminal according to Embodiment 1.

FIG. 11 is a more detailed flowchart of the video data repair processing in step S107 described above.

In step S201, repair data request section 115 of portable terminal 110 transmits recording failure information 151 (FIG. 5) received from recording result evaluating section 114 to home recorder 120.

In step S202, video data extraction section 123 of home recorder 120 receives recording failure information 151 (FIG. 5) from portable terminal 110.

In step S203, video data extraction section 123 of home recorder 120 extracts video data for repair from the corresponding video data that recorder side recording section 122 has stored in accordance with portion video data request information.

In step S204, video data transmission section 124 of home recorder 120 transmits the video data for repair to portable terminal 110.

In step S205, repair data reception section 116 of portable terminal 110 receives the video data for repair transmitted from home recorder 120.

In step S206, video data repair section 117 of portable terminal 110 performs processing of repairing a poor portion of the video data to end the flow. Details of the repair processing with use of the video data for repair will be described with reference to FIGS. 12 and 13.

Next, the video data repair processing with use of the video data for repair by video data repair section 117 will be described.

Figure 12:
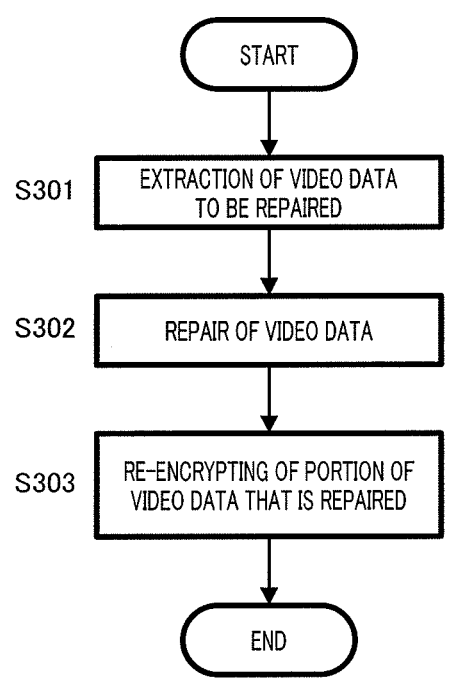
FIG. 12 is a flowchart showing the video data repair processing of the portable terminal according to Embodiment 1.

FIG. 12 is a flowchart showing the video data repair processing by video data repair section 117. FIG. 13 illustrates the video data repair processing by video data repair section 117.

Figure 13A:
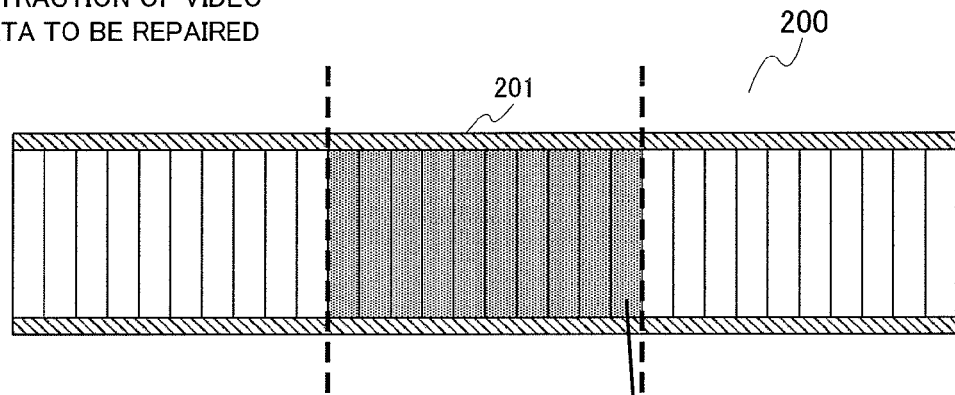
FIG. 13 illustrates the video data repair processing of the portable terminal according to Embodiment 1.

FIG. 13A shows copyrighted video data 200 saved in portable terminal 110.

In step S301, repair-target video data extraction section 117a of video data repair section 117 extracts video data to be repaired 201 from video data 200 in FIG. 13A based on recording failure information 151 (FIG. 5) received from recording result evaluating section 114.

Figure 13B:
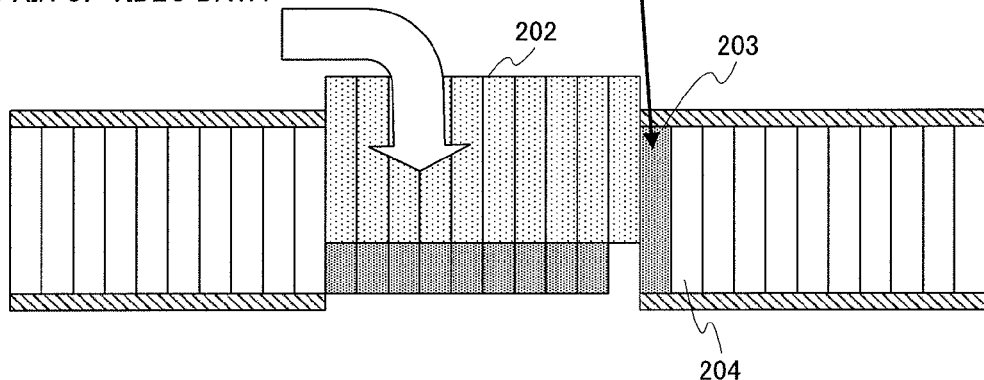

FIG. 13B illustrates video data repair processing performed by video data repair section 117. More specifically, repair section 117b of video data repair section 117 repairs the video data by replacing video data to be repaired 201 with video data for repair 202 that repair data reception section 116 has received (step S302). Especially, repair section 117b saves, instead of deleting at the time of repairing, data 203 for a block of video data to be repaired 201 that is necessary to decode video data 204 continuing after video data to be repaired 201. It is to be noted that data 203 for the block of video data to be repaired 201 corresponds to data 5' shown in FIGS. 7C and 9C.

Figure 13C:
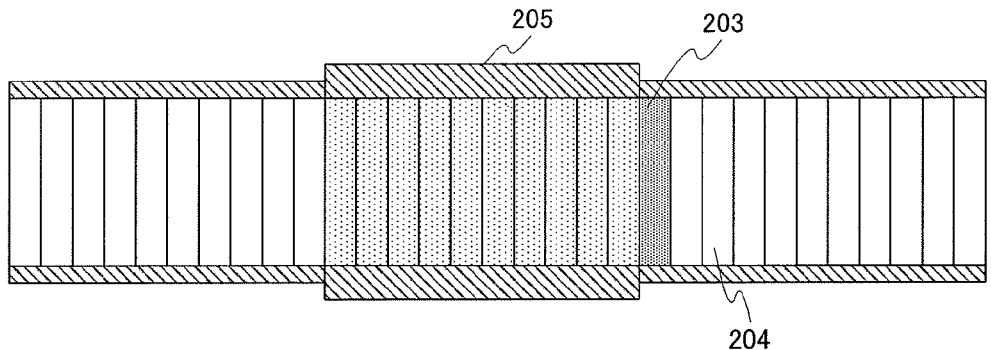

FIG. 13C shows repaired video data 205 that has been re-encrypted.

In step S303, re-encrypting section 117c of video data repair section 117 re-encrypts only video data for repair 202, which is a portion of the video data that is repaired.

Encrypted data 203 remaining in repaired video data 205 becomes meaningless data and is skipped in decoding reproducing processing, and normal playback is performed. That is, at the time of video playback, data resulting from decoding data 203 itself is not video data but meaningless data. Since a general video decoder detects format incorrectness for data without a defined format and skips processing, the decoder of portable terminal 110 skips decoding reproducing processing for the part.

As described above, with the present embodiment, portable terminal 110 has video data repair section 117 that repairs the video data which comprises poor video and is subject to repair, by replacing it with a portion of video data acquired from outside, and video data repair section 117 saves, instead of deleting at the time of repairing, a block that is necessary to decode video data continuing after the video data to be repaired and performs control so that only a portion of the video data that is repaired may be re-encrypted. Accordingly, only the portion that is repaired can be encrypted, and repair of copyrighted video data can be processed with low power consumption.

Also, in the configuration described in Patent Literature 1, in a case of video data compressed in an MPEG (Moving Picture Experts Group) method or the like, selection and repair of a video portion based only on time information at which video reception is determined to be failed may cause distortion of video at a joint point because, in a case where a frame at the joint point of video data not to be repaired with video data to be repaired is P frame (Predicted Frame) or B frame (Bi-directional Predicted Frame), which is a frame to be encoded by inter-frame prediction, frame data to be referred at the time of decoding is changed. In the present embodiment, video will not be distorted at joint parts of repaired portion.

Meanwhile, in the present embodiment, although data 203 shown in FIGS. 13B and 13C is saved to be connected to the video data, it may be saved in another area and referred to by the decoder in each necessary case.

Figure 1:
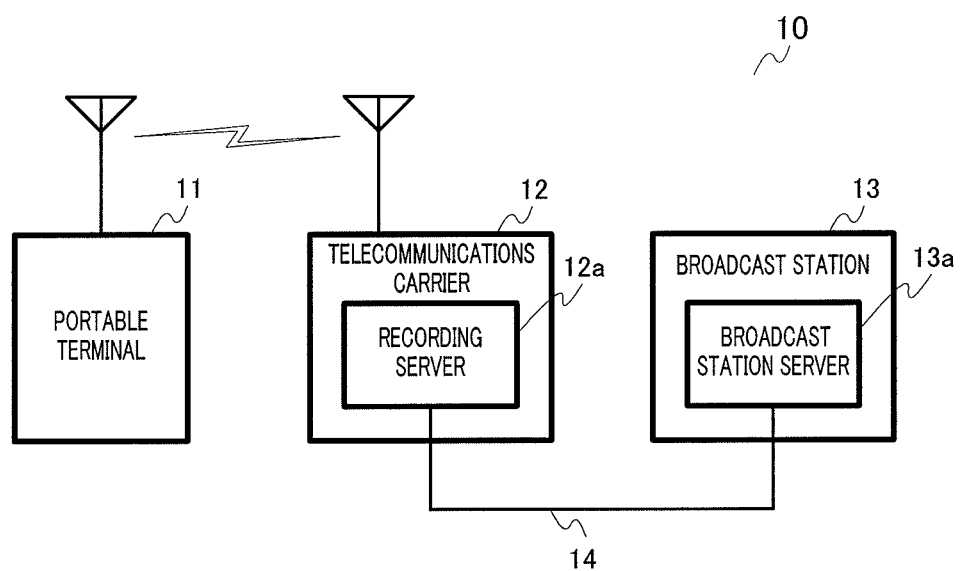
FIG. 1 illustrates a configuration of a conventional repair processing system of copyrighted video data.
Figure 2A:
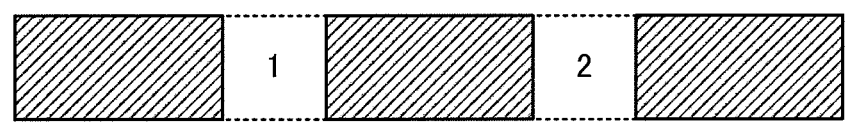
FIG. 2A schematically illustrates video data repair processing of a conventional portable terminal.
Figure 2B:
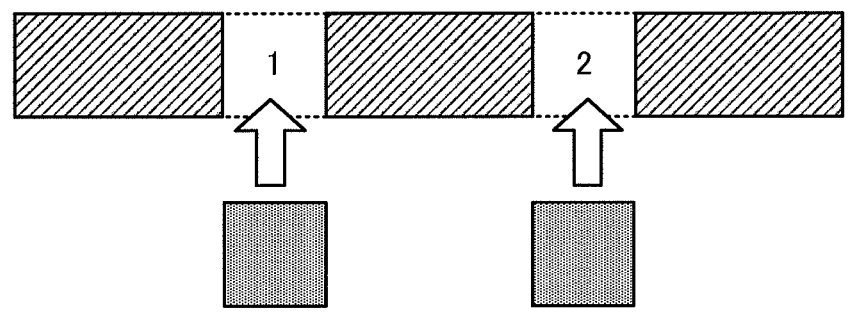
FIG. 2B schematically illustrates the video data repair processing of the conventional portable terminal.
Figure 2C:
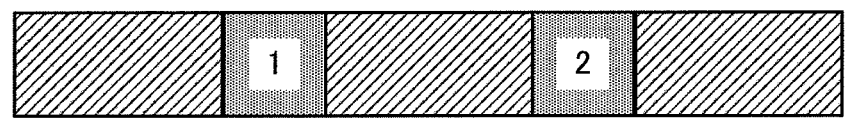
FIG. 2C schematically illustrates the video data repair processing of the conventional portable terminal.
Figure 3A:
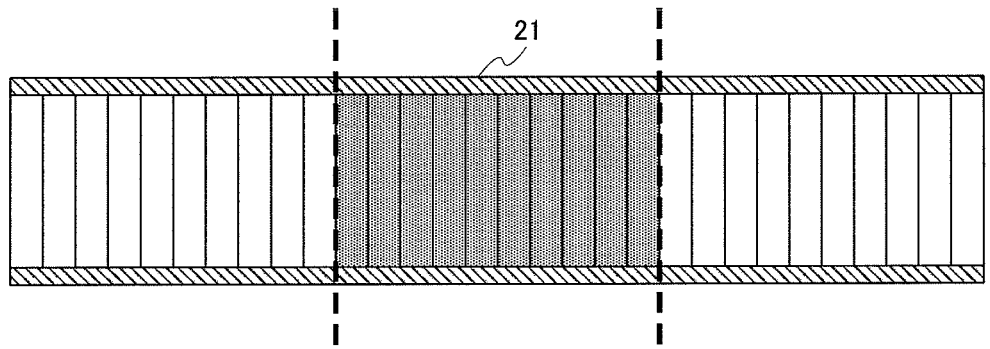
FIG. 3A schematically illustrates conventional repair processing of copyrighted video data.
Figure 3B:
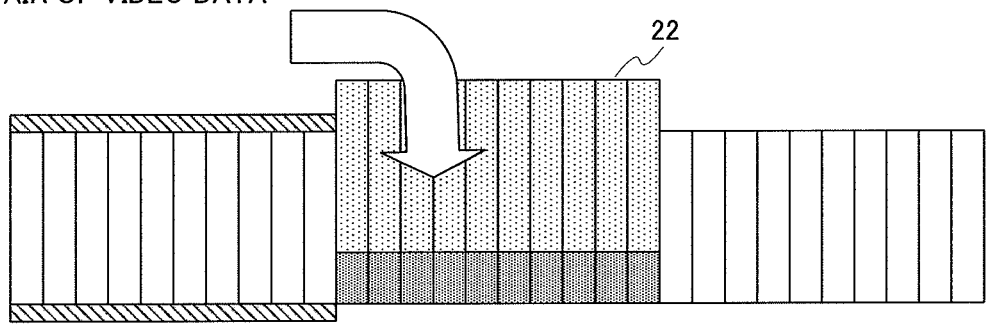
FIG. 3B schematically illustrates the conventional repair processing of copyrighted video data.
Figure 3C:
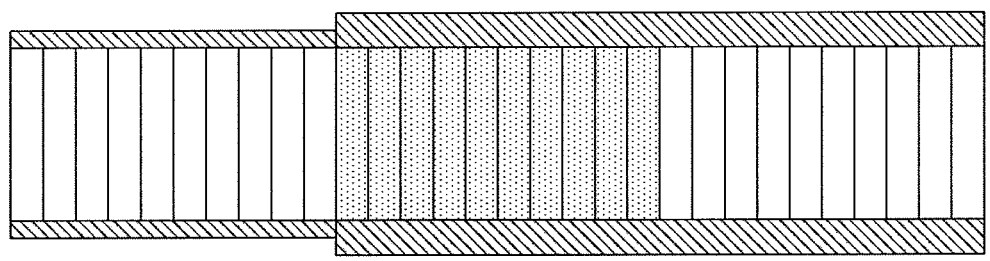
FIG. 3C schematically illustrates the conventional repair processing of copyrighted video data.

Also, in the present embodiment, although a section that externally supplies video data is home recorder 120, it may be a recording server as in the configuration example in the conventional method in FIG. 1. In this case, processing of requesting scheduled recording may be omitted. In a case where such a configuration is adopted, excessive re-encrypting processing can be eliminated by video data repair processing in which poor video data partially encrypted is saved, as a result of which repair of copyrighted video data can be processed with low power consumption.

Embodiment 2

In Embodiment 2, a scanning method of failed video data will be described.

Figure 14:
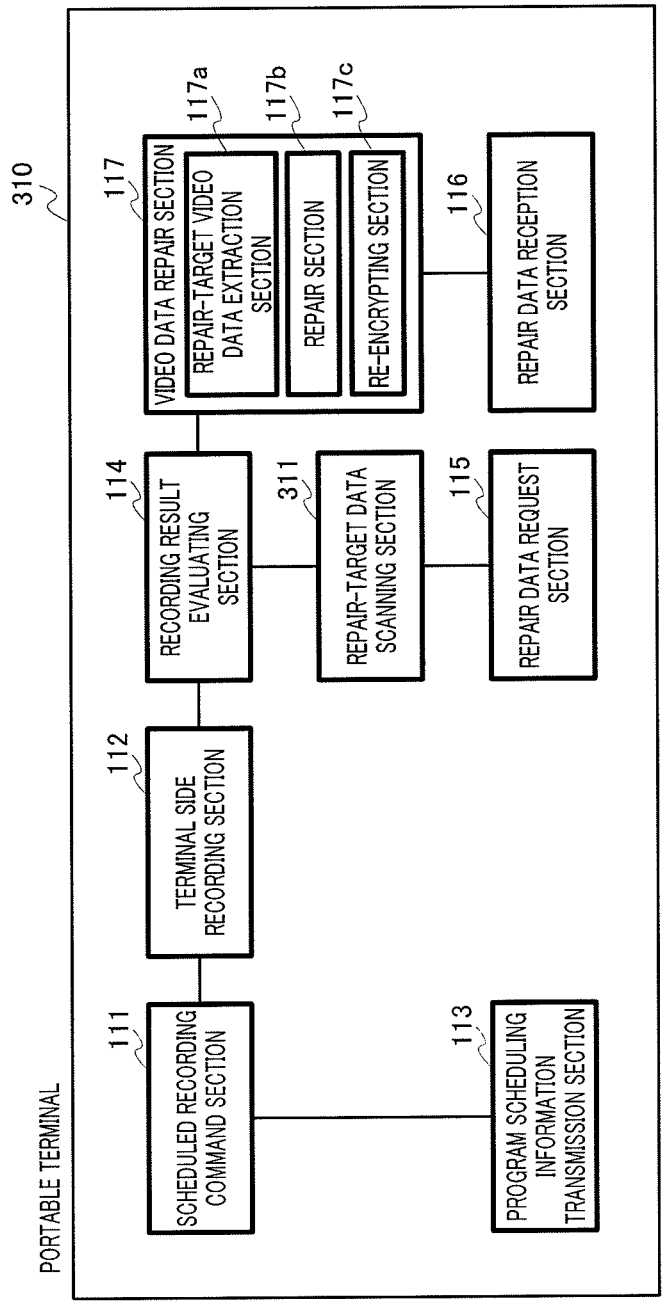
FIG. 14 is a functional block diagram illustrating a configuration of a portable terminal according to Embodiment 2 of the present invention.

FIG. 14 is a functional block diagram illustrating a configuration of a portable terminal according to Embodiment 2 of the present invention. The same components as those in FIG. 4 are shown with the same reference numerals, and description thereof will not be repeated here. Also, portable terminal 310 according to the present embodiment is applied instead of portable terminal 110 shown in FIG. 4.

As shown in FIG. 14, portable terminal 310 is configured to have scheduled recording command section 111, terminal side recording section 112, program scheduling information transmission section 113, recording result evaluating section 114, repair-target data scanning section 311, repair data request section 115, repair data reception section 116, and video data repair section 117.

Repair-target data scanning section 311 regards a portion in a time range in which video data that portable terminal 310 stores is determined to require repair as video data to be repaired, decodes and scans video data before and after the video data to be repaired per set unit, and re-sets portions in which video is determined not to be distorted even if the video data is replaced and repaired as a start point and an end point of the video data to be repaired. The portion in which video is determined not to be distorted even if the video data is replaced and repaired is a portion of a joint point in which video is determined not to be distorted when video data repair processing is performed.

Hereinafter, an operation of the portable terminal configured as above will be described. A basic idea and a basic operation are the same as those in Embodiment 1.

An operation of repair-target data scanning section 311 will be described in details with reference to FIGS. 15 and 16.

Figure 15:
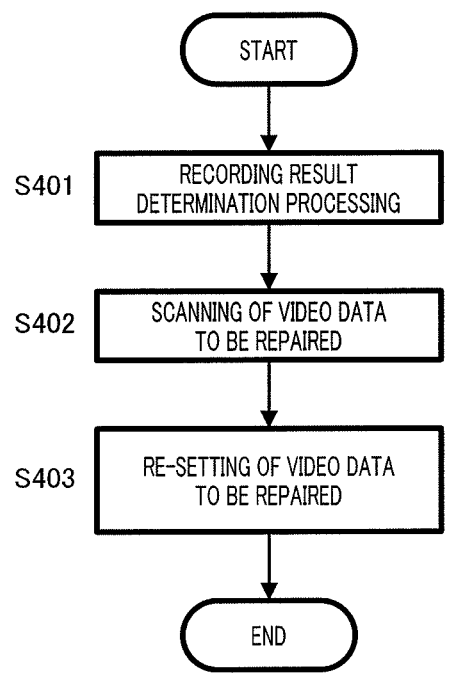
FIG. 15 is a flowchart showing an operation of a repair-target data scanning section of the portable terminal according to Embodiment 2.
Figure 16A:
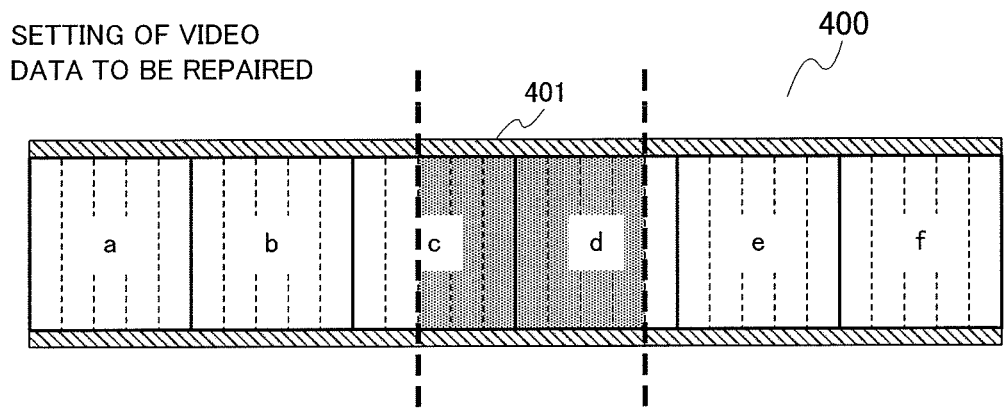
FIG. 16A illustrates the operation of the repair-target data scanning section of the portable terminal according to Embodiment 2.
Figure 16B:
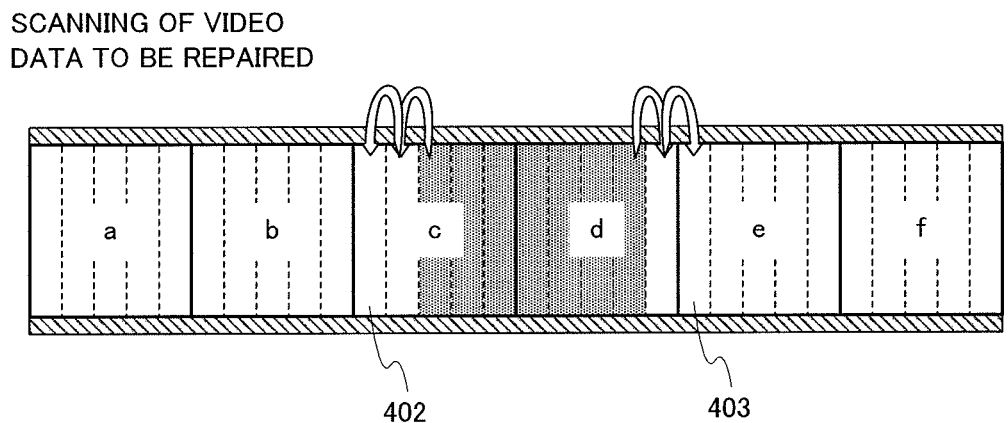
FIG. 16B illustrates the operation of the repair-target data scanning section of the portable terminal according to Embodiment 2.
Figure 16C:
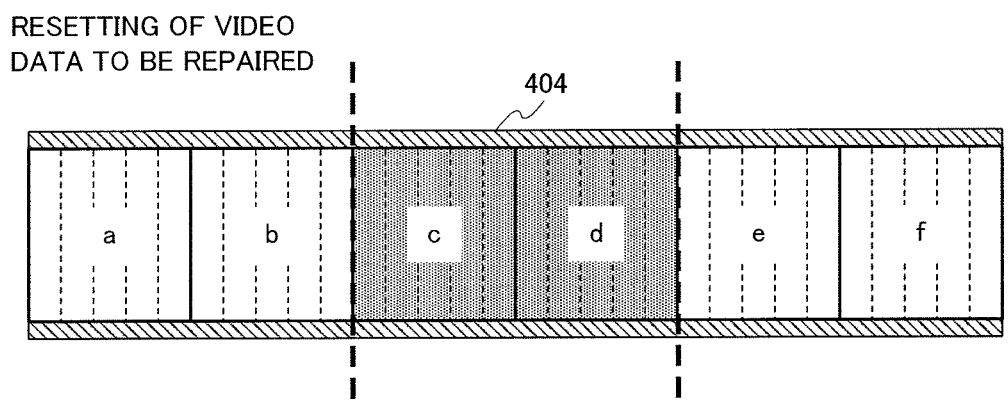
FIG. 16C illustrates the operation of the repair-target data scanning section of the portable terminal according to Embodiment 2.

FIG. 15 is a flowchart showing the operation of repair-target data scanning section 311, and FIGS. 16A to 16C illustrate the operation of repair-target data scanning section 311.

FIG. 16A illustrates copyrighted video data a to f saved in portable terminal 310.

Video data a to f represent video blocks in which no problem occurs in entire video quality even if a part of the video data is deleted or replaced. An example of the video block is a GOP, which is a group of frame data for efficient management of frames in a video compression codec used for digital recording.

In step S401, recording result evaluating section 114 determines that video data that terminal side recording section 112 is recording is distorted, or a blank is made in the video, and sets the video data as video data to be repaired 401. Recording result evaluating section 114 also collects recording failure information containing time information and a program channel.

FIG. 16B illustrates scanning processing of the video data to be repaired.

In step S402, repair-target data scanning section 311 decodes and searches start data 402 of video block c and start data 403 of video block e in a pre-set data unit.

FIG. 16C illustrates processing of re-setting video data to be repaired 404 containing video block c and video block d as the video data to be repaired as a result of searching start data 402 of video block c and start data 403 of video block e.

In step S403, video data repair section 117 re-sets video data to be repaired 404. By doing so, recording failure information is corrected.

Thus, the present embodiment is further provided with repair-target data scanning section 311 that regards a portion in a time range in which video data that portable terminal 310 stores is determined to require repair as video data to be repaired, decodes and scans video data before and after the video data to be repaired per set unit, and re-sets portions in which video is determined not to be distorted even if the video data is replaced and repaired as a start point and an end point of the video data to be repaired, which can prevent video at the joint points of the repaired video from being distorted.

Meanwhile, in the present embodiment, although the start point and the end point are scanned, an aspect in which only the end point is scanned may be adopted in a case where the video data for repair is video data in which I frame (Intra-coded Frame), in which video can be generated only by one-frame data in the MPEG method, is ensured to be definitely at the head. Since adoption of such a configuration enables the video data to be repaired to be set in a video block unit in which no problem occurs in entire video quality even if a part of the video data is deleted or replaced, it is possible to prevent video at the joint points from being distorted when the video data is repaired.

Embodiment 3

In Embodiment 3, communications between a portable terminal and the home recorder and a repair data generating method will be described.

Figure 17:
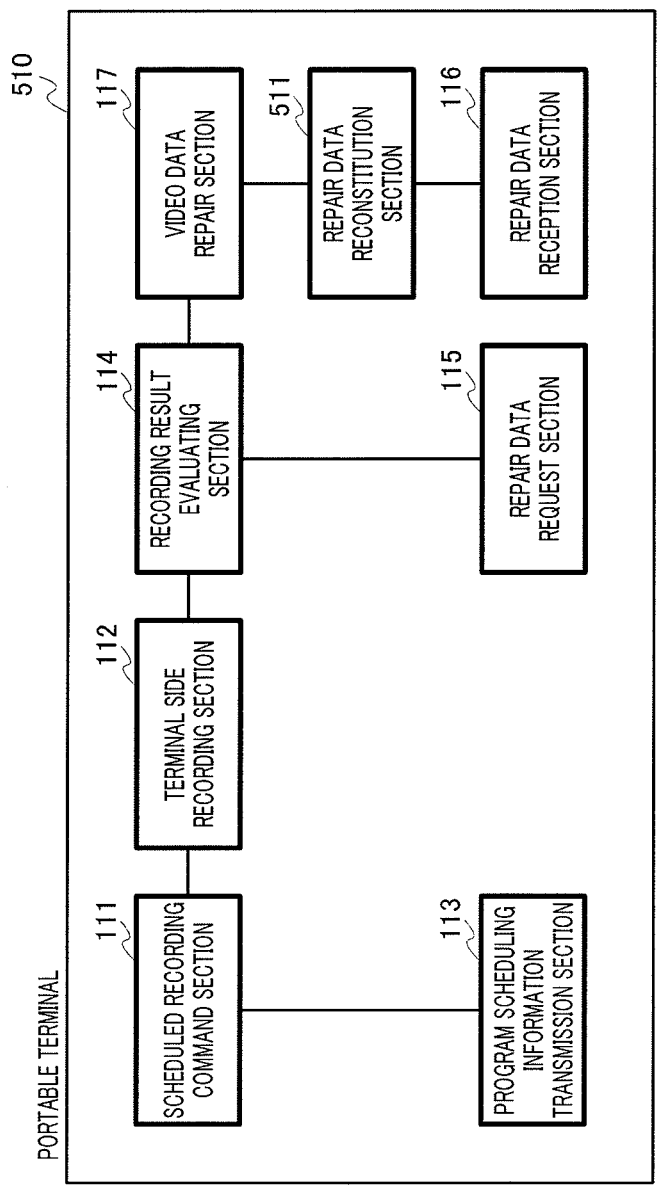
FIG. 17 is a functional block diagram illustrating a configuration of a portable terminal according to Embodiment 3 of the present invention.

FIG. 17 is a functional block diagram illustrating a configuration of a portable terminal according to Embodiment 3 of the present invention. The same components as those in FIG. 4 are shown with the same reference numerals, and decryption thereof will not be repeated here. Also, portable terminal 510 according to the present embodiment is applied instead of portable terminal 110 shown in FIG. 4.

As shown in FIG. 17, portable terminal 510 is configured to have scheduled recording command section 111, terminal side recording section 112, program scheduling information transmission section 113, recording result evaluating section 114, repair data request section 115, repair data reception section 116, repair data reconstitution section 511, and video data repair section 117.

Repair data reconstitution section 511 regards a portion of video data acquired from home recorder 120 as portion video data, once decodes the portion video data, extracts video data in the same time range as that of video data to be repaired, encodes the video data in a video format used for the video data to be repaired, and uses the video data as video data for repair in video repair processing.

Hereinafter, an operation of the portable terminal configured as stated above will be described. A basic idea and a basic operation are the same as those in Embodiment 1.

Figure 18:
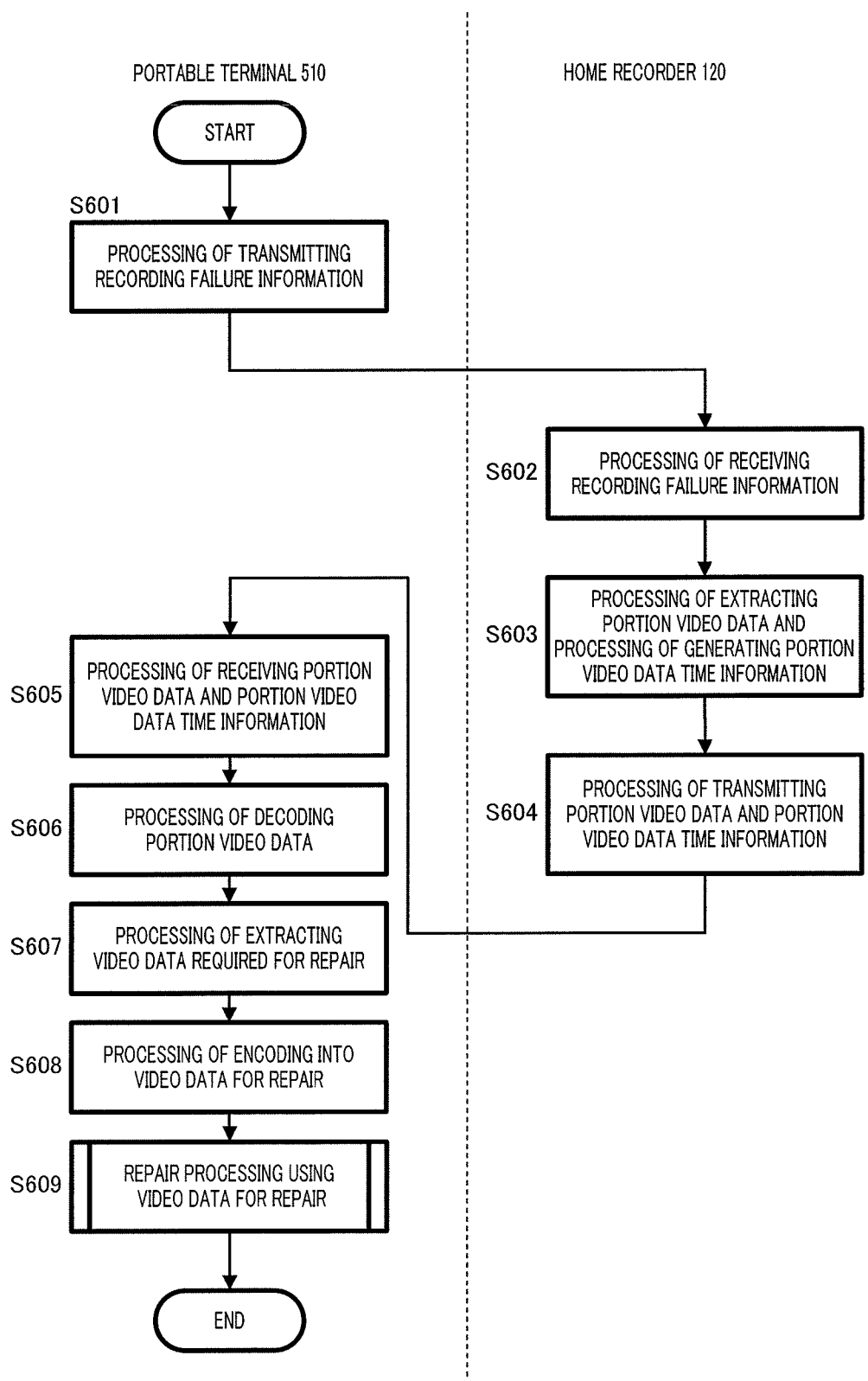
FIG. 18 is a flowchart showing an operation of a repair data reconstitution section of the portable terminal according to Embodiment 3.

FIG. 18 is a flowchart showing an operation of repair data reconstitution section 511.

In step S601, repair data request section 115 of portable terminal 510 transmits recording failure information received from recording result evaluating section 114 to home recorder 120.

In step S602, video data extraction section 123 of home recorder 120 performs processing of receiving portion video data request information by receiving recording failure information transmitted from portable terminal 510.

In step S603, video data extraction section 123 of home recorder 120 performs processing of extracting portion video data and processing of generating portion video data time information. Hereinafter, the processing of extracting portion video data and the processing of generating portion video data time information will be described.

Video data extraction section 123 extracts video data for repair from the corresponding video data that recorder side recording section 122 of home recorder 120 has stored in accordance with portion video data request information. At this time, in a case where the data specified by time information stored in the portion video data request information is not cuttable only by the portion because a head frame of the video data to be cut is a frame to be encoded by inter-frame prediction, for example, data in a wider range than that represented by the stored time information is extracted and is regarded as portion video data. Video data extraction section 123 also generates portion video data time information in which start time and end time of playback of the portion video data are stored. It is to be noted that, in a case where playback time of the portion video data can be analyzed from header information or the like, generation of portion video data time information is unnecessary.

In step S604, video data transmission section 124 of home recorder 120 transmits the extracted portion video data and the generated portion video data time information to portable terminal 510.

In step S605, repair data reception section 116 of portable terminal 510 receives the portion video data and the portion video data time information transmitted from home recorder 120.

In step S606, repair data reconstitution section 511 of portable terminal 510 performs processing of decoding the portion video data.

In step S607, repair data reconstitution section 511 of portable terminal 510 extracts video data required for repair from the decoded portion video data based on the playback time in the portion video data time information.

In step S608, repair data reconstitution section 511 of portable terminal 510 performs processing of encoding the extracted video data into the video data for repair in the same format and parameters as those of the video data to be repaired.

In step S609, video data repair section 117 of portable terminal 510 performs processing of repairing a poor portion of the video data with use of the generated video data for repair.

Thus, with the present embodiment, since portable terminal 510 further has repair data reconstitution section 511 that regards a portion of video data acquired from home recorder 120 as portion video data, once decodes the portion video data, extracts video data in the same time range as that of video data to be repaired, encodes the video data in a video format used for the video data to be repaired, and uses the video data as video data for repair in video repair processing, it is possible to repair video data saved in portable terminal 510 even in a case where a format kind and parameters of the video data for repair differ from those used for recording in portable terminal 510.

For example, in the configuration described in Patent Literature 1, in a case where a format kind and parameters of video data for repair differ from those used for recording in a portable terminal, video data saved in the portable terminal cannot be repaired. On the other hand, in the present embodiment, even in a case where an encoder kind (size and format) used for recording differs between the home recorder and the portable terminal, video data of portable terminal 510 can be repaired with use of video data of the home recorder.

The foregoing description is illustrative of preferred embodiments of the present invention, and the scope of the present invention is not limited to this.

Also, in the above respective embodiments, a portable terminal and a video data repair method are used as titles for the convenience of explanation, and a title of a device may be a portable terminal device or a display device while a title of a method may be a recorded data repair method.

Also, a kind, a number, and a connection method of the respective sections constituting the above portable terminal, such as the recording section and the decoding processing section, may be anything.

The above-described data repair methods may be implemented in the form of a program for making this image data repair method function, and this program may be stored in a computer-readable recording medium.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

Also, in the present embodiments, although home recorder 120 is a provider side of video data, telecommunications carrier 12 as shown in FIG. 1 illustrating a conventional example may be configured to have respective functional sections such as program scheduling information reception section 121, recorder side recording section 122, video data extraction section 123, and video data transmission section 124 (refer to FIG. 4), for example.

Further, the broadcast waves in the present embodiments include streaming broadcasting via a wireless access network represented by a wireless LAN (Wireless Local Area Network).

While the present invention has been described in detail with reference to specific embodiments, it is understood for those skilled in the art that numerous modifications and variations can be devised without departing from the spirit and scope of the invention.

The disclosure of Japanese Patent Application No. 2009-011039, filed on Jan. 21, 2009, including the specification, drawings and abstract, is incorporated herein by reference in its entirety.

INDUSTRIAL APPLICABILITY

The portable terminal and the video data repair method according to the present invention exert effects of reduction in the amount of processing and power consumption when performing repair and reliable repair of video data and are useful as functions of a portable terminal, such as a portable phone or a portable AV player, which requires low power consumption.

REFERENCE SIGNS LIST

100 Video data repair system
110, 310, 510 Portable terminal
111 Scheduled recording command section
112 Terminal side recording section
113 Program scheduling information transmission section
114 Recording result evaluating section
115 Repair data request section
116 Repair data reception section
117 Video data repair section
117a Repair-target video data extraction section
117b Repair section
117c Re-encrypting section
120 Home recorder
121 Program scheduling information reception section
122 Recorder side recording section
123 Video data extraction section 124 Video data transmission section
130 Network
311 Repair-target data scanning section
511 Repair data reconstitution section

The invention claimed is:

1. A portable terminal that saves video data encrypted by a method of superimposing a result of encoding a previous video data clear text block upon a following clear text block by a bit operation, a result of which is encrypted, the portable terminal comprising:
a video data repair section that repairs video data which comprises poor video and is subject to repair, by replacing the video data with a portion of video data acquired from an external source,
wherein the video data repair section comprises:
a repair section that saves, without deleting, a last part of the video data to be repaired at the time of repairing the video data by replacing the extracted video data to be repaired with video data for repair; and
a re-encrypting section that re-encrypts only the video data for repair,
wherein the last part of the video data to be repaired is data used for decrypting subsequent video data continuing after the video data to be repaired at the time of playback, and the last part of the video data to be repaired itself is ignored while the playback is performed.

2. The portable terminal according to claim 1, further comprising:
a repair-target data scanning section that determines a portion in a time range in which the video data requires repair as the video data to be repaired, decodes and scans video data before and after the video data to be repaired per set unit, and re-sets portions in which video is determined not to be distorted even if the video data is replaced and repaired as a start point and an end point of the video data to be repaired.

3. The portable terminal according to claim 1, further comprising:
a repair data reconstitution section that, when the video data is encoded video data, determines the portion of video data acquired from the external source for repair as the portion of video data, decodes the portion of video data once, extracts video data in the same time range as the video data to be repaired, and uses the video data encrypted in a video format used for the video data to be repaired as the video data for repair in video repair processing.

4. The portable terminal according to claim 1,
wherein the video data is encrypted in a CBC (Cipher Block Chaining) mode, and the last part of the video data to be repaired has a fixed length corresponding to a width of the superimposing.

5. A video data repair method of repairing video data which comprises poor video and is subject to repair, by replacing the video data with a portion of video data acquired from an external source, the method comprising and sequentially executing:
extracting the video data to be repaired from video data;
repairing the video data which comprises poor video and is subject to repair, by replacing the video data with the portion of the video data acquired from the external source;
saving, without deleting, a last part of the video data to be repaired at the time of repairing the video data by replacing the extracted video data to be repaired with video data for repair; and
re-encrypting only the video data for repair,
wherein the last part of the video data to be repaired is data used for decrypting subsequent video data continuing after the video data to be repaired at the time of playback, and the last part of the video data to be repaired itself is ignored while the playback is performed.

6. The video data repair method according to claim 5, further comprising:
determining a portion in a time range in which the video data requires repair as the video data to be repaired and decoding and scanning video data before and after the video data to be repaired per set unit; and
re-setting portions in which video is determined not to be distorted even if the video data is replaced and repaired as a start point and an end point of the video data to be repaired.

7. The video data repair method according to claim 5, further comprising:
determining the portion of video data acquired from the external source for repair as the portion of video data and decoding the portion of video data once;
extracting video data in the same time range as the video data to be repaired; and
using the video data encrypted in a video format used for the video data to be repaired as the video data for repair in video repair processing.

8. The portable terminal according to claim 5,
wherein the video data is encrypted in a CBC (Cipher Block Chaining) mode, and the last part of the video data to be repaired has a fixed length corresponding to a width of the superimposing.

* * * * *